(12) United States Patent
Wang et al.

(10) Patent No.: US 10,783,408 B2
(45) Date of Patent: Sep. 22, 2020

(54) IDENTIFICATION OF FONTS IN AN APPLICATION

(71) Applicant: Adobe Inc., San Jose, CA (US)

(72) Inventors: Zhaowen Wang, San Jose, CA (US); Sarah Aye Kong, Cupertino, CA (US); I-Ming Pao, Palo Alto, CA (US); Hailin Jin, San Jose, CA (US); Alan Lee Erickson, Highlands Ranch, CO (US)

(73) Assignee: ADOBE INC., San Jose, CA (US)

( * ) Notice: Subject to any disclaimer, the term of this patent is extended or adjusted under 35 U.S.C. 154(b) by 67 days.

(21) Appl. No.: 15/626,749

(22) Filed: Jun. 19, 2017

(65) Prior Publication Data

US 2018/0365536 A1    Dec. 20, 2018

(51) Int. Cl.
| | | |
|---|---|---|
| *G06K 9/68* | (2006.01) | |
| *G06T 7/11* | (2017.01) | |
| *G06K 9/18* | (2006.01) | |
| *G06K 9/66* | (2006.01) | |
| *G06N 3/02* | (2006.01) | |
| *G06K 9/62* | (2006.01) | |
| *G06N 3/08* | (2006.01) | |
| *G06N 3/04* | (2006.01) | |
| *G06K 9/46* | (2006.01) | |

(52) U.S. Cl.
CPC ............ *G06K 9/6828* (2013.01); *G06K 9/18* (2013.01); *G06K 9/6215* (2013.01); *G06K 9/66* (2013.01); *G06N 3/02* (2013.01); *G06N 3/0454* (2013.01); *G06N 3/08* (2013.01); *G06T 7/11* (2017.01); *G06K 9/4609* (2013.01)

(58) Field of Classification Search
None
See application file for complete search history.

(56) References Cited

U.S. PATENT DOCUMENTS

| | | | |
|---|---|---|---|
| 9,501,724 B1 | 11/2016 | Yang et al. | |
| 2002/0194261 A1* | 12/2002 | Teshima | G06F 17/214 |
| | | | 709/203 |
| 2012/0114241 A1* | 5/2012 | Vincent | G06K 9/3258 |
| | | | 382/176 |
| 2014/0195903 A1* | 7/2014 | Kaasila | G06F 17/214 |
| | | | 715/269 |
| 2017/0098138 A1 | 4/2017 | Wang et al. | |

(Continued)

FOREIGN PATENT DOCUMENTS

CN        102681978 A  *  9/2012

OTHER PUBLICATIONS

Erica Garnet, "Filtering and Finding Fonts in Adobe Apps", Jun. 2, 2017.*

(Continued)

*Primary Examiner* — Jiangeng Sun

(57) ABSTRACT

Systems and techniques for identification of fonts include receiving a selection of an area of an image including text, where the selection is received from within an application. The selected area of the image is input to a font matching module within the application. The font matching module identifies one or more fonts similar to the text in the selected area using a convolutional neural network. The one or more fonts similar to the text are displayed within the application and the selection and use of the one or more fonts is enabled within the application.

18 Claims, 9 Drawing Sheets

(56) References Cited

U.S. PATENT DOCUMENTS

2017/0098140 A1 4/2017 Wang et al.
2017/0098141 A1 4/2017 Wang et al.
2017/0140248 A1 5/2017 Wang et al.

OTHER PUBLICATIONS

"About Fonts", Adobe Systems Incorporated, retrieved from https://helpx.adobe.com/photoshop/using/fonts.html#match_fonts, Jun. 16, 2017, 11 pages.
Valentine, "Wang Develops Font Recognition System for Adobe", ECE Illinois, Dec. 3, 2015, 7 pages.
Wang, et al., "DeepFont: A System for Font Recognition and Similarity", Proceedings of the 23rd ACM international conference on Multimedia. ACM, 2015, 2 pages.
Wang, et al., "DeepFont: Identify Your Font from an Image", Proceedings of the 23rd ACM international conference on Multimedia. ACM, 2015, 9 pages.

\* cited by examiner

IDENTIFICATION OF FONTS IN AN APPLICATION

TECHNICAL FIELD

This description relates to the identification of fonts in an application.

BACKGROUND

Users, such as designers, using an application such as a design application may encounter technical challenges when attempting to recognize and match a font from a picture. For example, the designer may have an old design stored in a pixelated format and cannot remember the name of the font in the design. Or, a designer may take a picture of an interesting font without knowing the name of the font. In both examples, the designer may desire to determine the fonts from the pixelated format of the picture and use the fonts in a work that the designer is creating using the design application. The designer may have to use a cumbersome process involving a number of non-integrated different tasks using multiple, different applications to identify the fonts because technically there was no solution to identify the fonts in a seamless manner from within the design application.

In one example, to identify the desired fonts, the designer may need to manually review the fonts that are installed on the designer's local computing device and to visually match one or more of the installed fonts, which may include thousands of fonts or more. Similar fonts may differ by only very subtle differences. Manually identifying similar fonts to the desired fonts may not be feasible and/or may be challenging to identify the most similar fonts from potentially thousands of fonts or more. Further, the designer may be limited to those fonts that are locally stored without being able to view fonts that are stored remotely.

In another example, to identify the desired fonts, the designer may need to crop the picture to bound the area which contains the characters, then save the cropped area to a file and submit the file to one or more font recognition websites to obtain the font results. In some cases, it may take a lot of time to prepare the proper picture to submit to the font recognition websites. Once the font results are obtained from the font recognition websites, then the designer needs to synchronize the fonts to the design application before the designer can commence using the fonts. This process to identify the desired fonts and to use the fonts is both tedious and time consuming for the designer as well as being non-automated and non-integrated as part of the design application.

SUMMARY

According to one general aspect, systems and techniques for identification of fonts include receiving a selection of an area of an image including text, where the selection is received from within an application. The selected area of the image is input to a font matching module within the application. The font matching module identifies one or more fonts similar to the text in the selected area using a convolutional neural network. The one or more fonts similar to the text are displayed within the application and the selection and use of the one or more fonts is enabled within the application.

In another general aspect, systems and techniques for identification of fonts include receiving a selection of an area of an image including text. The selected area of the image is input to a font matching module. The font matching module identifies one or more fonts similar to the text in the selected area using both a convolutional neural network and a font similarity model. The one or more fonts similar to the text are displayed and the selection and use of the one or more fonts is enabled.

In another general aspect, a system for identification of fonts implements an application having a user interface, a font matching module and a display window. The user interface includes a selection tool to select an area of an image including text. The font matching module receives the area of the image including the text from the selection tool and identifies one or more fonts similar to the text using a convolutional neural network. The display window within the user interface displays the one or more fonts similar to the text.

The details of one or more implementations are set forth in the accompanying drawings and the description below. Other features will be apparent from the description and drawings, and from the claims.

DETAILED DESCRIPTION

Figure 1:
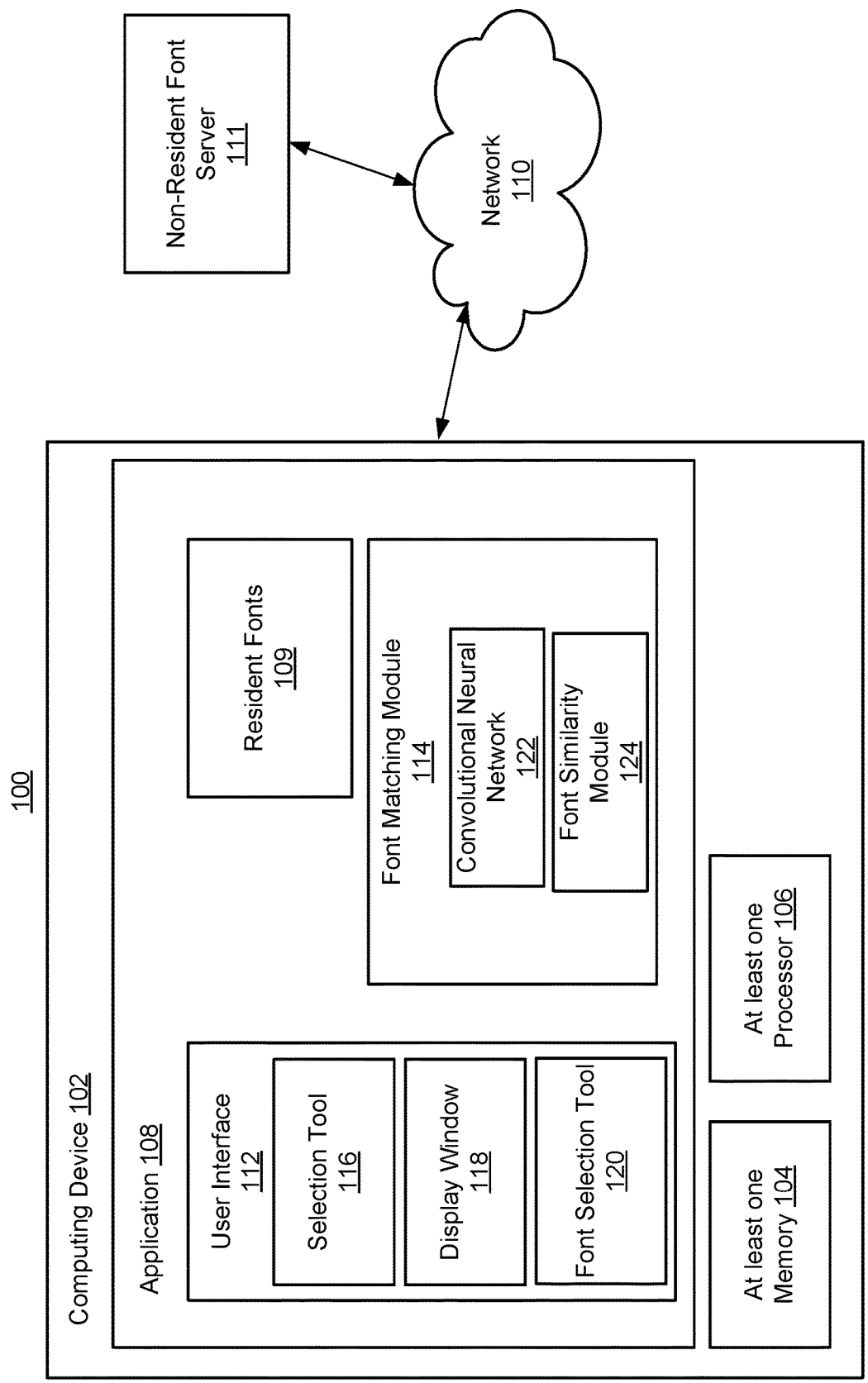
FIG. 1 is a block diagram of a system for automated identification of fonts within a single application.

This document describes systems and techniques that provide for automated font recognition, font previewing, font syncing, and using a selected font all from within a single application, such as a design application, using a seamless user interface. Such systems and techniques overcome technical challenges of previous systems and techniques and improve the process to identify a font in an automated manner, meaning without the user having to manually determine one or more fonts similar to a desired font. From within the single application, a selected area of an image is input into a font matching module that uses a convolution neural network instead of character segmentation or optical character recognition (OCR) to automatically identify one or more fonts similar to a font in the selected area. The font matching module used within the single application is a more efficient, faster and more accurate algorithm than other algorithms that depend on character segmentation or OCR.

The systems and techniques provide a user interface within the single application to enable users to choose the region where the font is to be identified. The user interface enables users to freely adjust the size and location of a selection tool, such as a bounding box, in a picture. The area selected by the selection tool is input into the font matching module to automatically identify fonts similar to the fonts within the selected area. Each time the selected area is changed or moved using the selection tool the updated selection area is input into the font matching module and a new set of results are provided to the user in real time without the user having to select a submit button. The font results are displayed in multiple, different categories including resident fonts, which are fonts installed locally, and non-resident fonts, which are fonts that are not stored locally but are rendered for viewing by the user along with the resident fonts. One of the displayed resident fonts may be selected and used immediately within the single application. Non-resident fonts may be synchronized and downloaded for use within the single application.

The systems and techniques described in this document integrate all of the tasks for font recognition within the single application using the seamless user interface and font matching module. Thus, a user may select a region of interest to identify and preview similar fonts, to synchronize any non-resident fonts and to use all the resident fonts and synchronize non-resident fonts within a single application. Advantageously, the systems and techniques described in this document eliminate the need to crop images and upload them to a separate font recognition website and to download and synchronize a desired font to the design application from the font recognition website. Additionally, the systems and techniques using this single application enable font recognition of unseen and untrained fonts. Untrained and unseen fonts include fonts that were not trained as part of the convolutional neural network. Untrained and unseen fonts may be fonts that are present on a user's computing device or on a remote computing device but that were not trained as part of the convolutional neural network. The font matching module may use font similarity to identify fonts similar to fonts that were not seen and trained by the convolutional neural network. For example, the font matching module may be applied to any untrained fonts present on a user's computing device, or any new fonts present on a remote computing device but not installed on the local computing device.

Additionally, the systems and techniques described herein advantageously improve other technology areas. For example, the systems and techniques may be used for a more automated and more efficient and faster approach when applied to face recognition technology. The automated font matching algorithms along with the improved work flow process and seamless user interface may be used to improve face recognition technology, as well as other technologies that rely on image recognition and identification of other images similar to a desired image.

FIG. 1 is a block diagram of a system 100 for automated identification of fonts within a single application. The system 100 includes a computing device 102 having at least one memory 104, at least one processor 106 and at least one application 108. The computing device 102 may communicate with one or more other computing devices over a network 110. For instance, the computing device 102 may communicate with a non-resident font server 111 over the network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the application 108 and its components and fonts used by the application 108.

The network 110 may be implemented as the Internet, but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application 108 may be accessed directly by a user of the computing device 102. In other implementations, the application 108 may be running on the computing device 102 as a component of a cloud network where a user accesses the application 108 from another computing device over a network, such as the network 110. In one implementation, the application 108 may be a graphic design application. The graphic design application may be a standalone application that runs on the computing device 102. Alternatively, the graphic design application may be an application that runs in another application such as a browser application.

The graphic design application enables a user to create and design many different kinds of graphics and layouts including using different types of fonts in the design being created. The application 108 enables users to automatically identify a font from an image being displayed within the application 108. The application 108 enables the user to identify the font, including a name of the font, and to view a rendered sample of the identified font. The application 108 enables the user to view both resident fonts 109 and non-resident fonts 111. A resident font 109 is a font that is stored on the computing device 102. A non-resident font 111 is a font that is not stored on the computing device 102, but is instead stored on a remote computing device such as the non-resident font server 111. The application 108 enables the user to begin using resident fonts 109 immediately within the design in the application 108. The application 108 enables the user to synchronize and download non-resident fonts 111 and to begin using the downloaded non-resident font within the design in the application 108. In this manner, all of the tasks needed to complete the font identification of text within an image, including any font synchronization of non-resident fonts and use of a selected similarly identified font, may be accomplished with in the same single application 108.

The resident fonts 109 may include a database of fonts that are available for immediate use by the application 108, meaning that the fonts do not need to be synchronized or downloaded to the application 108. While the resident fonts 109 are illustrated as part of the application 108, in some implementations the resident fonts 109 may be stored outside of the application 108 but on the computing device 102. As mentioned above, the non-resident fonts may be stored remotely on a non-resident fonts server 111.

The application 108 includes a user interface 112 and a font matching module 114. The user interface 112 includes a selection tool 116, a display window 118 and a font selection tool 120. The user interface 112 includes other elements and components for use as part of the application 112, which are not described here but which also form a part of the application. For instance, the user interface 112 may include a work area to create a design as well as many tools and layers that may be used to create the design in the work area. The user interface 112 is used to display an image that includes text. The text may include a font for which the user desires to identify the font and to use the font as part of the design. The image may be any type of image, which may be stored in different formats. For example, the image may include an image stored in JPEG, which is pixelated without text layer information available.

The selection tool 116 is used to select an area of the image, which may include text that the user wants to identify the font. In one implementation, the selection tool 116 is a bounding box that is used to surround the area of the image that the user wants to identify the font. The bounding box is a box with four sides that can be changed in size and moved within the user interface 112 to identify the bounds of a desired selection area. The bounding box may be rectangular or square in shape, can be tilted and/or rotated and can be both increased and decreased in size through the use of mouse drag operations in order to set the size of the bounding box. In some implementations, the selection tool 116 may use a different types of selection mechanisms other than, or in addition to, the bounding box.

The selection tool 116, implemented as a bounding box, may perform automatic refinements to refine the area within the box selected by a user. For example, the bounding box may include a neural network that receives as input the user defined box area and outputs a refined box area, where the refined box area automatically adjust one or more of the lines of the bounding box to match the glyphs of the enclosed text. For example, using the machine learning of the neural network, a top line of the bounding box may be automatically adjusted without user input to match a top glyph of the text within the bounding box. Also, a bottom line of the bounding box may be automatically adjusted without user input to match a bottom glyph of the text within the bounding box, including eliminating parts of text characters that fall below the bottom glyph of the text. The refined bounding box also may be rotated to match any rotation of the text enclosed in the box. In this manner, the bounding box refinement eliminates extraneous pixels from being input and processed by the font matching module 114, which reduces the computational time of the font matching module 114. The refined bounding box also may remove homogenous regions on the left and right sides of the box to further reduce the number of pixels being processed by the font matching module 114. Additional information regarding bounding box refinement techniques may be found in U.S. Published Application No. 2017/0098140, which is hereby incorporated by reference in its entirety.

Once the area of the image is selected using the selection tool 116, the selected area of the image is input to the font matching module 114. The font matching module 114 includes one or more different types of font matching mechanisms to match the text within the selected area to other similar fonts that are both resident fonts 109 and non-resident fonts 111. In one implementation, the font matching module 114 includes a convolutional neural network 122 and a font similarity module 124. The font matching module 114 may use one or more of the font matching mechanisms to match the text within the selected area to other similar fonts. For example, the font matching module may use either the convolutional neural network 122 or the font similarity module 124 or a combination of the convolutional neural network 122 and the font similarity module 124 to match the text within the selected area to other similar fonts.

The input to the font matching module 114 may include a grayscale image of the area of the image including text. The font matching module 114 uses the grayscale image and creates a bitmap of the grayscale image. For example, the convolutional neural network 122 takes as input the grayscale image. The convolutional neural network 122 compares the input grayscale image to the thousands of fonts that the neural network has been trained on, which may include 20,000 or more fonts used to train the convolutional neural network. The convolutional neural network 122 outputs a probability distribution based on all the fonts that the convolution old neural network is trained on. The convolutional neural network 122 selects the fonts with the highest probability distribution as the most similar fonts to the font input from the image. In some implementations, the convolutional neural network 122 may receive and process other types of inputs including, for example, a color image.

Additional details regarding the training and operation of the convolutional neural network 122 may be found in U.S. Pat. No. 9,501,724, which is hereby incorporated by reference in its entirety. The convolutional neural network 122 may include a modified architecture with a reduced number of neurons in certain layers so that the trained model is smaller in size and compatible for use within the application 108.

In some implementations, the font similarity module 124 may be used to supplement or complement the results from the convolutional neural network 122. For example, the recognized fonts may not all be synced during the training of the convolutional neural network 122 and the font similarity module 124 may be used to identify resident fonts that have not been synced with the trained convolutional neural network 122.

In some implementations, the font similarity module 124 may be used to conduct a separate query of the selected image to identify similar fonts in addition to the query conducted by the convolutional neural network 122. The font similarity module 124 uses a mathematical model to measure the similarity of any two fonts and obtain a scalar where the larger the scalar the more similar the fonts. The font similarity module 124 may query fonts that are part of the resident fonts 109 but have not been trained on the convolutional neural network 122 (i.e., unseen and untrained fonts). The font similarity module 124 uses the mathematical model to obtain a scalar for the untrained fonts and can compare this scalar with other scalars calculated for the trained fonts to determine when untrained fonts are similar to the fonts being selected as similar by the convolutional neural network 122. In this manner, the resident fonts 109 may include fonts that have been trained and are synchronized with the convolutional neural network 122 and fonts that have not been trained and are not synchronized with the convolutional neural network 122. In some embodiments, the font recognition performed by the convolutional neural network 122 and/or the font similarity module 124 may be combined with other font recognition techniques such as, for example, glyph recognition to obtain a list of similar fonts.

The font matching module 114 returns a list of both resident fonts 109 and/or non-resident fonts 111 to the display window 118. The list of fonts may be segregated between the resident fonts 109 and the non-resident fonts 111. From within the display window 118, a user may use a font selection tool 120 to select and use one or more of the font results. For the resident fonts 109, the display window 118 renders a sample of the font. For the non-resident fonts 111, the application 108 links to the non-resident font server 111 through the network 110 to obtain a sample of the font for rendering in the display window 118. The font selection tool 120 enables the user to select resident fonts 109 and immediately begin to use the selected font within the user interface 112. The font selection to 120 enables the user to select non-resident fonts 111 and to synchronize and download the selected non-resident font 111 for use within the user interface 112. In this manner, a user interface 112 and a seamless workflow is provided for users to prepare an image for font identification, to identify and preview the fonts similar to the font in the image and to use the fonts all within the same application 108. The user can also choose to display only a list of resident fonts or only a list of non-resident fonts.

To obtain a list of the non-resident fonts, the font matching module 114 in the application 108 requests a list of non-resident fonts identified as similar to a font in the image captured by the selection tool 116 from the non-resident font server 111. The request for the list includes authentication information such as, for example, a token and/or a user identifier. The non-resident font server 111 uses the authentication information to determine entitlement to preview and/or download those fonts on the list and provides availability information for each requested font back to the font matching module 114. The font matching module 114 requests a subset of glyphs for the available fonts from the non-resident font server 111. The non-resident font server 111 returns the subset of glyphs to the font matching module 114 and the display window 118 uses the subset of glyphs to render a preview of the similar non-resident fonts. If a user selects one of the non-resident fonts in the display window 118 to synchronize and download, a font sync request for the selected font, along with authentication information, is communicated to the non-resident font server 111. The non-resident font server 111 returns the full font to the application 108 for use within the application 108. The downloaded font may be stored and change status to a resident font 109.

Further user interactions with the selection tool 116 cause a new search by the font matching module 114. In response to a change of the area of the image using the selection tool 116, the font matching module 114 automatically identifies one or more fonts similar to the text in the selected different area using the convolutional neural network 122 and/or the font similarity module 124. For example, if a user changes the size of the bounding box and/or moves the bounding box, then the font matching module 114 automatically, without user intervention, searches for similar fonts contained in the new area bounded by the box. The results from the font matching module are updated in the display window 118 and available for selection by the font selection tool 120 for use within the user interface 112.

The font matching module 114 may trigger interactive prompts to the user for display on the user interface 112. For instance, the font matching module 114 may trigger a prompt to the user to adjust the selection tool 116 or move the selection tool 116 to select a different part of the image if there are no similar fonts. The font matching module 114 may use a minimum threshold probability distribution from the convolutional neural network 122 and/or a minimum confidence score from the font similarity module 124 to trigger a prompt or notice or other indication to the user to make a change in the selected area using the selection tool 116.

Figure 2:
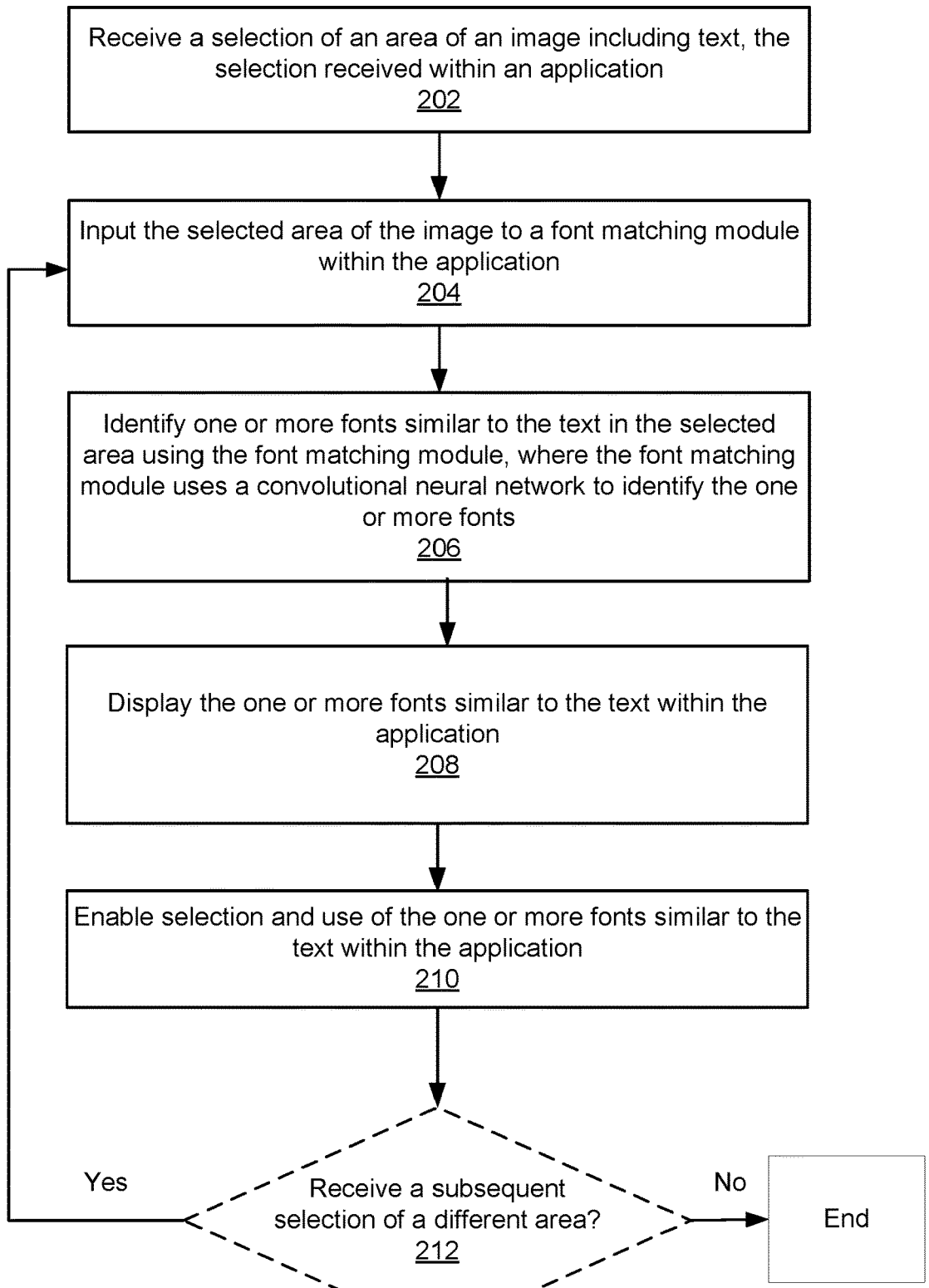
FIG. 2 is a flowchart illustrating example operations of the system of FIG. 1.

Referring to FIG. 2, a process 200 illustrates example operations of the system 100 of FIG. 1 including the application 108. Process 200 includes receiving a selection of an area of an image including text, where the selection is received within an application (202). For example, with reference to FIG. 1, the selection tool 116 within the user interface 112 of application 108 may be used to receive a selection an area of an image including text. As discussed above, the selection tool 116 may be implemented as a bounding box. As discussed, the bounding box may automatically adjust one or more of the lines of the bounding box to match the glyph of the enclosed text. For example, a top line of the bounding box may be automatically adjusted without user input to match a top glyph of the text within the bounding box. Also, a bottom line of the bounding box may be automatically adjusted without user input to match a bottom glyph of the text within the bounding box.

Process 200 includes inputting the selected area of the image to a font matching module within the application (204). For example, the area of the image selected using the selection tool 116 is input to the font matching module 114.

Process 200 includes identifying one or more fonts similar to the text in the selected area using the font matching module, where the font matching module uses a convolutional neural network to identify the one or more fonts (206). For example, the font matching module 114 identifies one or more fonts similar to the text in the selected area using the convolutional neural network 122. In some implementations, the font matching module 114 also may use the font similarity module 124 either alone or in combination with the convolutional neural network 122 to identify the one or more fonts.

Process 200 includes displaying the one or more font similar to the text within the application (208). For example, the font matching module 114 renders the one or more fonts similar to the text within the display window 118 in the user interface 112. As discussed above, the font matching module 114 identifies the resident fonts 109 and non-resident fonts 111 that are similar to the text in the selected area. Both the resident fonts 109 and the non-resident fonts 111 are listed in the display window 118 including a rendering of a sample font for each of the similar fonts.

Process 200 includes enabling selection and use of the one or more fonts similar to the text within the application (210). For example, the font selection tool 120 may be used to select one of the fonts rendered within the display window 118 and use the selected font in the user interface 112. Resident fonts 109 may be used immediately in the application 108. Non-resident fonts 111 may be synchronized and downloaded from the non-resident font server 111 and then used in the application 108.

Figure 3:
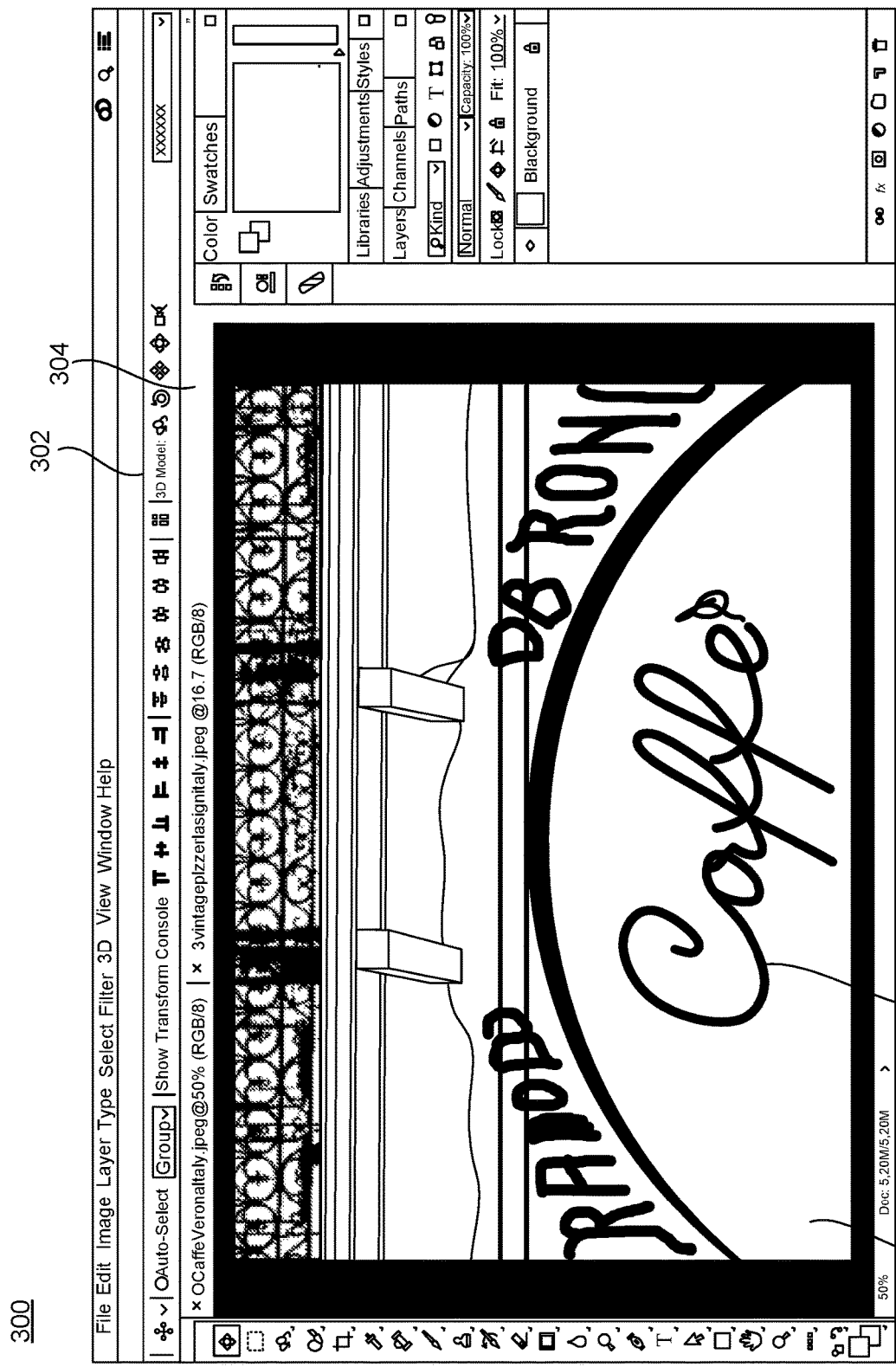
FIG. 3 is an example screen shot illustrating a user interface of an application for automated identification of fonts.

Referring to FIGS. 3-9, example screenshots illustrate a user interface within an application for automated identification of fonts. FIG. 3 illustrates an example screenshot 300 of an application 302 having a user interface 304. In this example, the application 302 is a graphic design application. The user interface 304 is showing a picture 306, which has a sign "Caffe" 308 in it. In this example, the user desires to match the font from the word "Caffe" 308 and to use that font in a design.

Figure 4:
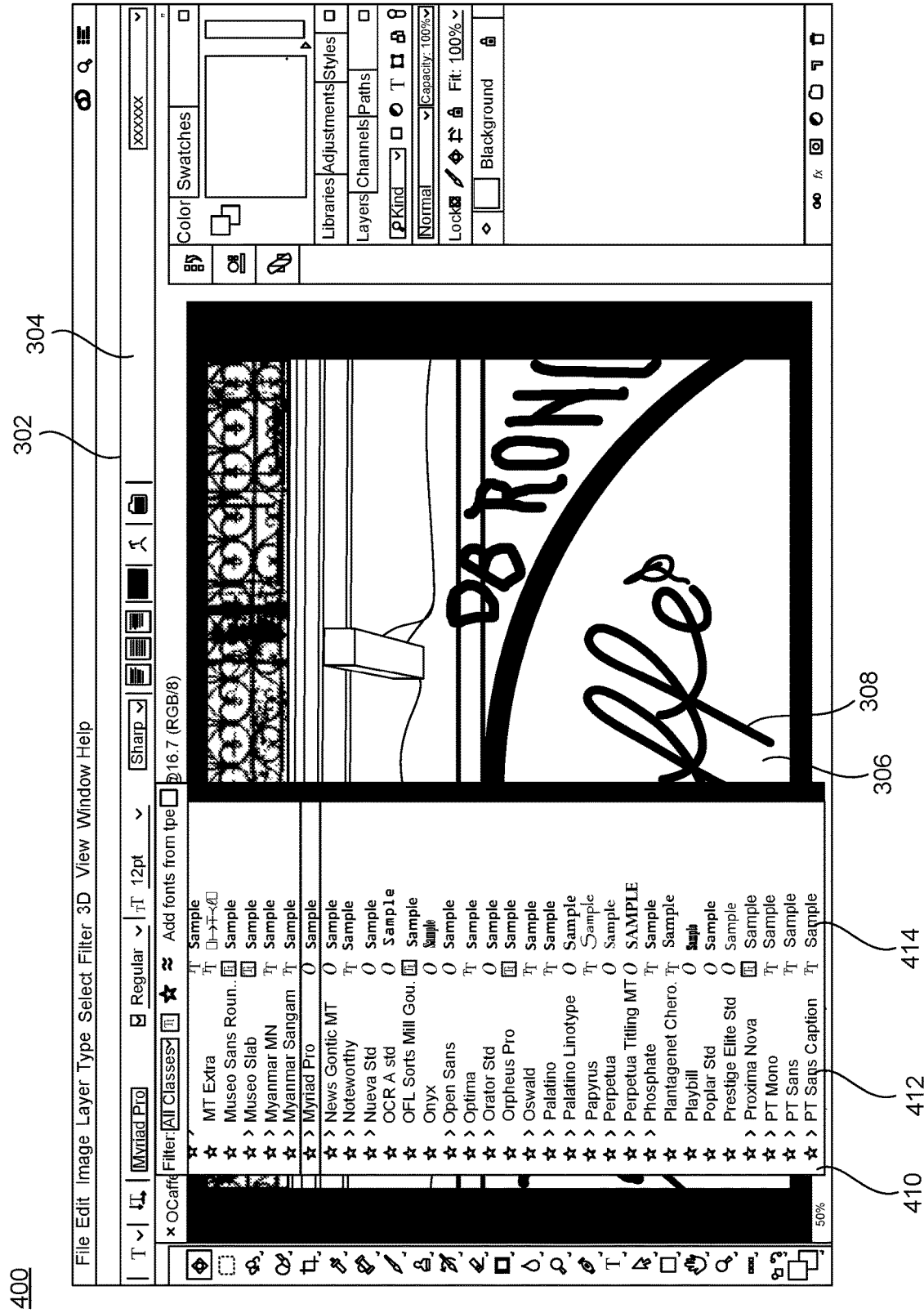
FIG. 4 is an example screen shot illustrating a user interface of an application for automated identification of fonts.

Referring also to FIG. 4, the screenshot 400 illustrates that the application 302 includes a list of fonts 410. The list of fonts 410 includes a name of the font 412 and a rendered "Sample" 414 previewing each of the fonts. The list of fonts 410 may be limited to resident fonts. Due to the number of fonts in the list of fonts 410, it may be time-consuming and challenging to examine each font and decide which one is close to the "Caffe" 308 sign font in the image 306. Instead of manually examining each font to decide which one is the most similar, the user may invoke the automated font identification feature in the application 302.

Figure 5:
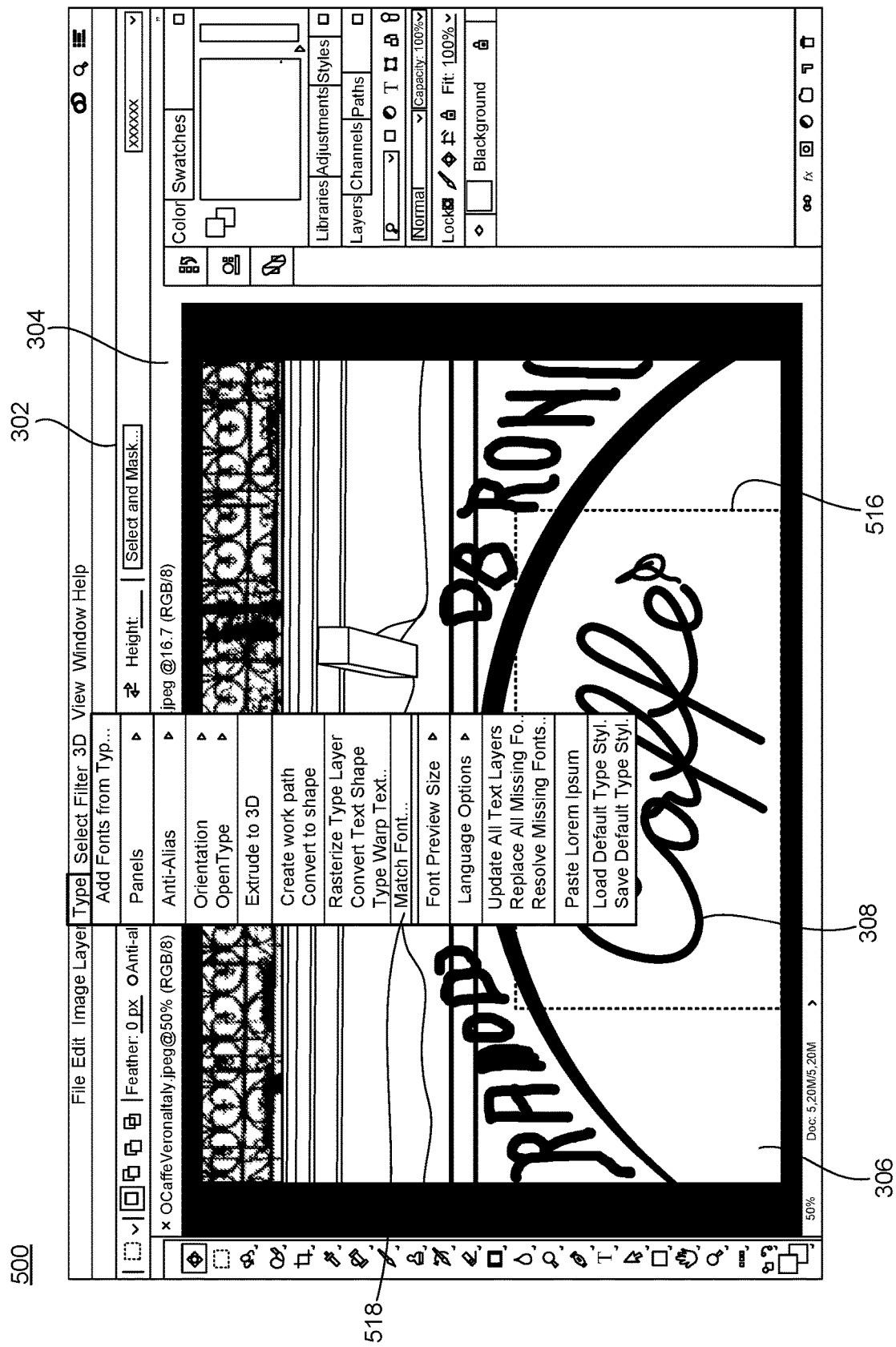
FIG. 5 is an example screen shot illustrating a user interface of an application for automated identification of fonts.

Referring to FIG. 5, the screenshot 500 illustrates the application 302 having the user interface 304 and a selection tool 516 that is used to select an area of the image 306 that includes the text "Caffe" 308. In this example, the selection tool 516 is a bounding box that may be sized and/or moved to capture a desired area of the image 306. The user has arranged the selection tool 516 around the word "Caffe" 308 and selected the match font tool 518 from the drop-down menu to invoke inputting the selected area to the font matching module, such as the font matching module 114 of FIG. 1. The font matching module 114 uses a convolution neural network 122 and/or a font similarity module 124 to identify one or more fonts similar to the font in the word "Caffe" 308, as discussed above.

Figure 6:
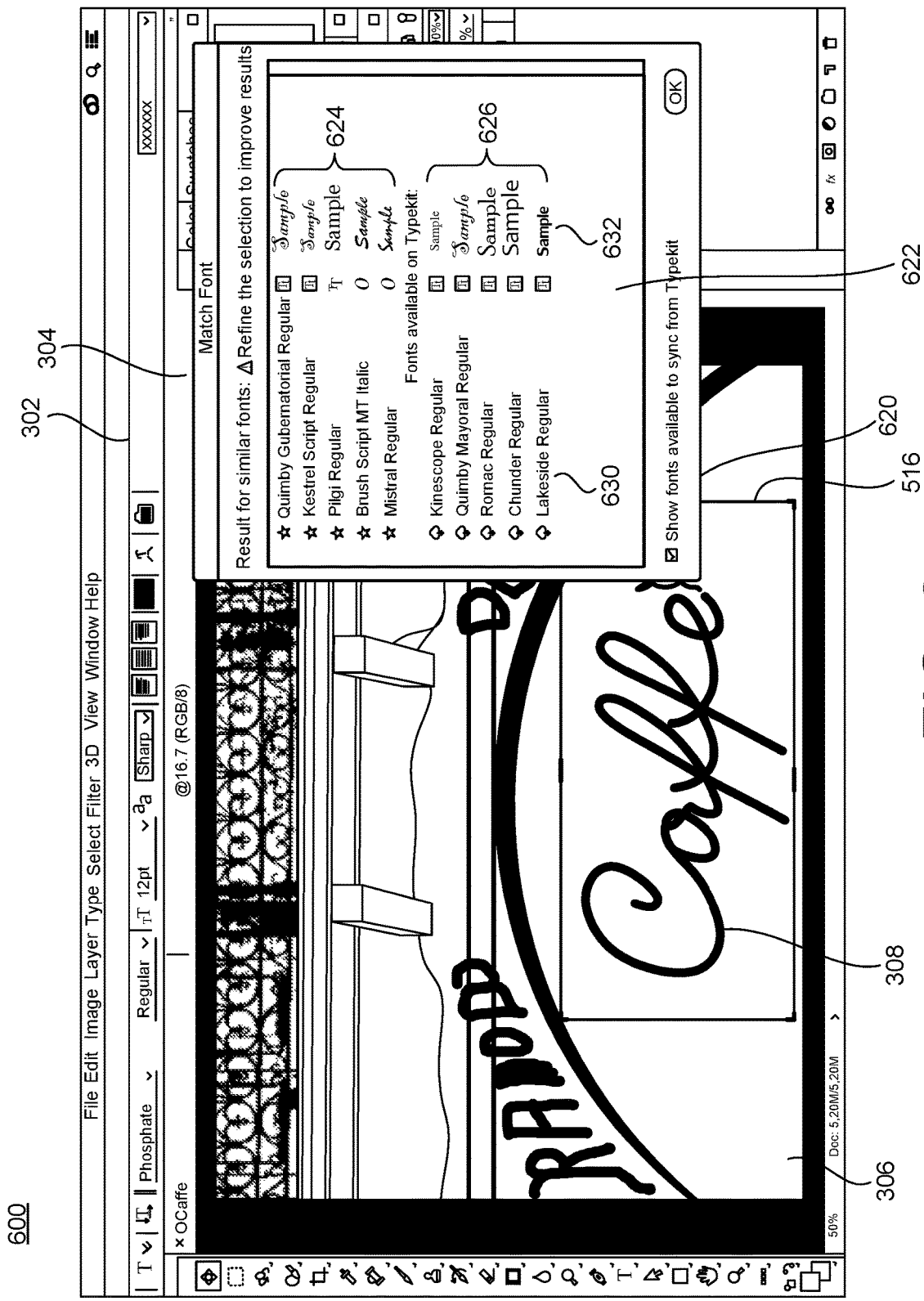
FIG. 6 is an example screen shot illustrating a user interface of an application for automated identification of fonts.
Figure 7:
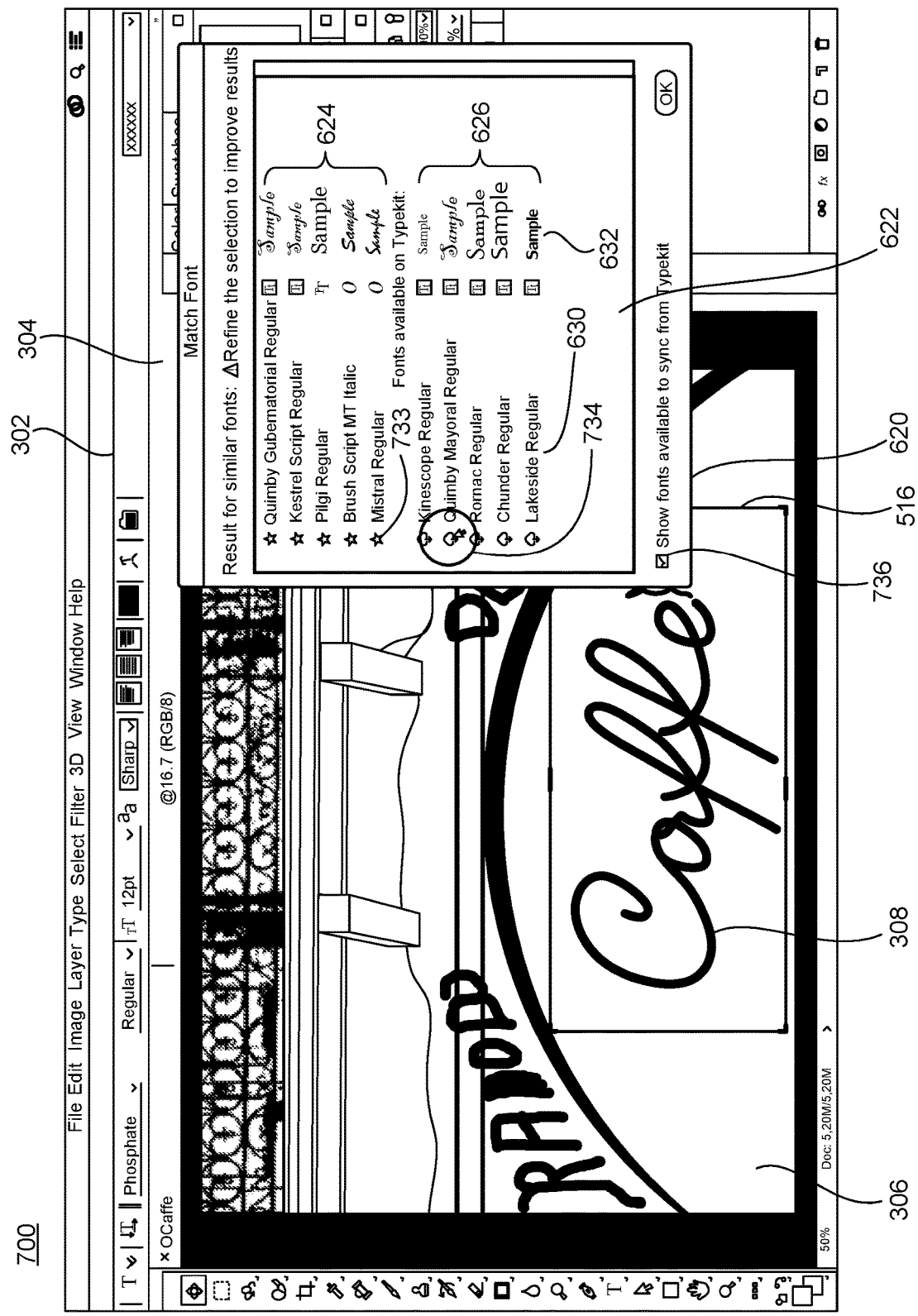
FIG. 7 is an example screen shot illustrating a user interface of an application for automated identification of fonts.

Referring also to FIG. 6, a screenshot 600 illustrates the display window 620 which includes a list of fonts 622 that are most similar to the font in the text "Caffe" 308. The list of fonts 622 is divided into 2 groups: the resident fonts 624 and the non-resident fonts 626. Each of the groups 624 and 626 includes a name of the font 630 and a "Sample" 632 rendering of the font to provide the user a visual representation of the font, including both capitalized letters and small letters. In some implementations, different words other than "Sample" may be rendered in the display window 620 to provide various illustrations of the rendered fonts. An optional OCR process may be performed on the text "Caffe" 308 to identify the specific letters in the text and those identified letters may be used in place of or in addition to the word "Sample" to provide a visual illustrations of the similar fonts. The resident fonts 624 may be selected and used in the design because they already reside on the local computing device. A font may be designated as a favorite by selecting the favorite icon 733, which adds the font to a list of favorites, for example, from a favorites drop-down menu for quicker user access to such designated fonts. The non-resident fonts 626 may be downloaded by selecting the cloud icon 734 as illustrated in the screenshot 700 of FIG. 7. The process for displaying, synchronizing and downloading non-resident fonts is described above in more detail. Selection box 736 provides the user the option to include or not include the non-resident fonts 626 in the display window 620.

Figure 8:
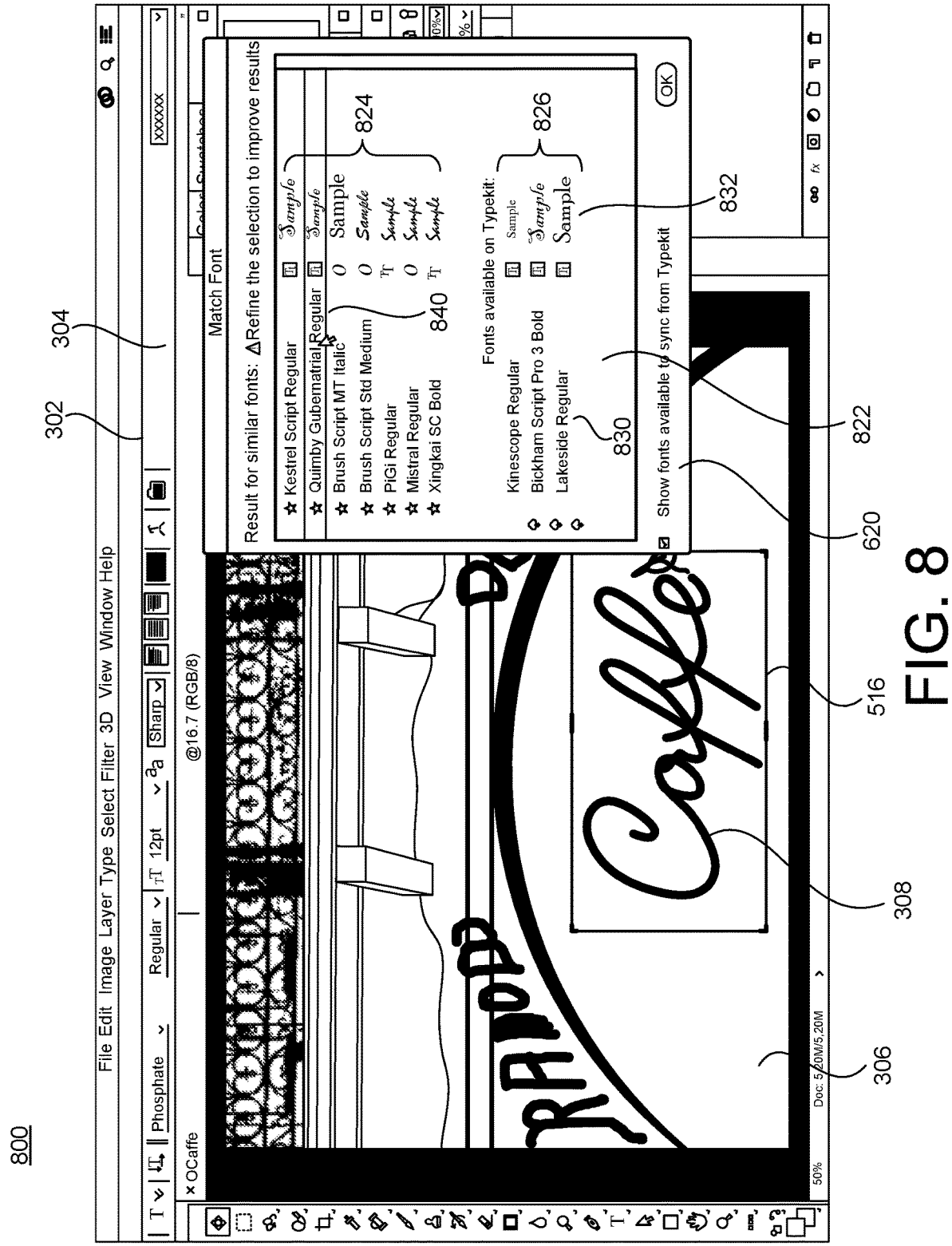
FIG. 8 is an example screen shot illustrating a user interface of an application for automated identification of fonts.

Referring to FIG. 8, a screenshot 800 illustrates the selection tool 516 being used to change the size of the selected area around the word "Caffe" 308. Using the selection tool 516 to change the shape or size of the selected area causes the font matching module to automatically identify one or more fonts similar to the text in the different area using the convolutional neural network. The display window 620 is automatically updated with a new list of similar fonts 822. The new list of similar fonts 822 includes both resident fonts 824 and non-resident fonts 826 that are similar to the text in the different area. While in this example the text itself does not change, the smaller bounding box provides a different focus of the text as input to the font matching module to identify one or more similar fonts.

Figure 9:
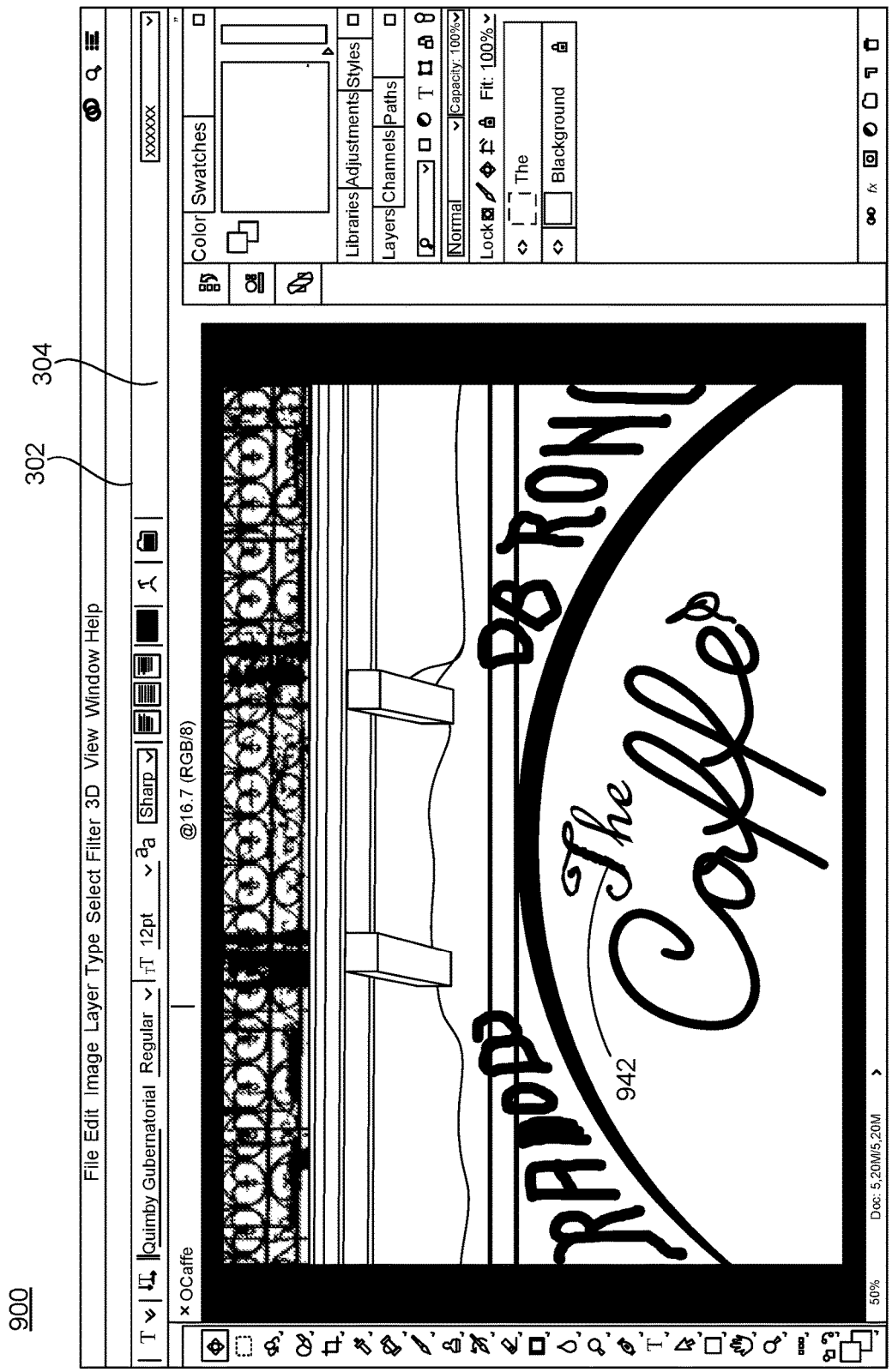
FIG. 9 is an example screen shot illustrating a user interface of an application for automated identification of fonts.

In this example, one of the fonts 840 from the resident fonts 824 is selected using the font selection tool 120 for use within the design in the user interface 304. Referring to FIG. 9, a screenshot 900 illustrates the selected font 840 be used in the design by adding the word the 942 in the selected font. In this manner, all of the actions needed to identify one or more fonts similar to the font in an image are completed within the same application 302 using the user interface 304.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identification of fonts within an application, the method comprising:
   receiving a selection of an area of an image including text, the selection received from within the application;
   inputting the selected area of the image to a font matching module within the application;
   identifying one or more fonts similar to the text in the selected area using the font matching module, wherein the font matching module uses both a convolutional neural network and a font similarity module to identify the one or more fonts and the identifying includes:
      generating, by the convolutional neural network, a probability distribution as a similarity measure of trained fonts,
      selecting, by the convolutional neural network, one or more trained fonts that are similar to the text in the selected area using the probability distribution,
      generating, by the font similarity module using a mathematical model, a scalar as a similarity measure of untrained fonts,
      comparing the scalar with scalars of the one or more trained fonts, and
      selecting one or more untrained fonts that are similar to the text in the selected area based on the comparison; and
   displaying the one or more trained fonts and the one or more untrained fonts as the one or more fonts identified as similar to the text within the application.

2. The computer-implemented method as in claim 1, further comprising:
   receiving a subsequent selection of a different area of the image including text, the subsequent selection received from within the application;
   responsive to receiving the subsequent selection automatically:
      inputting the selected different area of the image to the font matching module within the application;
      identifying one or more fonts similar to the text in the selected different area using the font matching module; and
      displaying the one or more fonts identified as similar to the text in the selected different area within the application.

3. The computer-implemented method as in claim 1, wherein receiving the selection of the area of the image comprises using a bounding box to surround the area of the image including the text and to select the text within the bounding box by automatically adjusting a top line of the bounding box to match a top glyph of the text within the bounding box and a bottom line of the bounding box to match a bottom glyph of the text within the bounding box.

4. The computer-implemented method as in claim 1, wherein:
   identifying the one or more fonts similar to the text comprises identifying both one or more resident fonts similar to the text and one or more non-resident fonts similar to the text; and
   displaying the one or more fonts identified as similar to the text comprises rendering both the one or more resident fonts identified as similar to the text and the one or more non-resident fonts identified as similar to the text for display within the application.

5. The computer-implemented method as in claim 4, further comprising:
   enabling selection and use of the one or more identified fonts within the application; and
   responsive to receiving a selection of one of the one or more non-resident fonts, synchronizing the selected non-resident font for use within the application.

6. The computer-implemented method as in claim 1, wherein identifying the one or more fonts similar to the text comprises:
   inputting a grayscale image of the area of the image including text to the convolution neural network;
   generating the probability distribution using fonts trained as part of the convolution neural network; and
   selecting the one or more similar fonts for display within the application using the fonts with a highest probability distribution.

7. A computer program product for identification of fonts within an application, the computer program product being tangibly embodied on a non-transitory computer-readable storage medium and comprising instructions that, when executed by at least one computing device, are configured to cause the at least one computing device to:
   receive a selection of an area of an image including text;
   input the selected area of the image to a font matching module; and
   identify one or more fonts similar to the text in the selected area using the font matching module, wherein the font matching module uses both a convolutional neural network and a font similarity module to identify the one or more fonts and the instructions that cause the at least one computing device to identify the one or more fonts include instructions that, when executed by the at least one computing device, cause the at least one computing device to:
      generate, by the convolutional neural network, a probability distribution as a similarity measure of trained fonts,
      select, by the convolutional neural network, one or more trained fonts that are similar to the text in the selected area using the probability distribution,
      generate, by the font similarity module using a mathematical model, a scalar as a similarity measure of untrained fonts, compare the scalar with scalars of the one or more trained fonts, and select one or more untrained fonts that are similar to the text in the selected area based on the comparison.

8. The computer program product of claim 7, further comprising instructions that, when executed by the at least one computing device, are configured to cause the at least one computing device to:

display the one or more trained fonts and the one or more untrained fonts as the one or more fonts identified as similar to the text.

9. The computer program product of claim 8, further comprising instructions that, when executed by the at least one computing device, are configured to cause the at least one computing device to:

enable selection and use of the one or more identified fonts.

10. The computer program product of claim 7, wherein the instructions that, when executed by the at least one computing device, are configured to cause the at least one computing device to identify the fonts similar to the text in the selected area include instructions that, when executed by the at least one computing device, are configured to cause the at least one computing device to:

identify both one or more resident fonts similar to the text and one or more non-resident fonts similar to the text.

11. The computer program product of claim 10, further comprising instructions that, when executed by the at least one computing device, are configured to cause the at least one computing device to:

render both the one or more resident fonts identified as similar to the text and the one or more non-resident fonts identified as similar to the text for display.

12. The computer program product of claim 11, further comprising instructions that, when executed by the at least one computing device, are configured to cause the at least one computing device to:

synchronize the selected non-resident font for use responsive to receiving a selection of one of the one or more non-resident fonts.

13. The computer program product of claim 7, wherein the instructions that, when executed by the at least one computing device, are configured to cause the at least one computing device to identify the fonts similar to the text in the selected area include instructions that, when executed by the at least one computing device, are configured to cause the at least one computing device to:

input a grayscale image of the area of the image including text to the convolution neural network;

generate the probability distribution using fonts trained as part of the convolution neural network; and select the one or more similar fonts for display using the fonts with a highest probability distribution.

14. The computer program product of claim 13, wherein the instructions that, when executed by the at least one computing device, are configured to cause the at least one computing device to receive the selection of the area of the image include instructions that, when executed by the at least one computing device, are configured to cause the at least one computing device to:

use a bounding box to surround the area of the image including the text and to select the text within the bounding box by automatically adjusting a top line of the bounding box to match a top glyph of the text within the bounding box and a bottom line of the bounding box to match a bottom glyph of the text within the bounding box.

15. A system for identification of fonts within an application, the system comprising:

at least one memory including instructions; and at least one processor that is operably coupled to the at least one memory and that is arranged and configured to execute instructions that, when executed, cause the at least one processor to implement an application, the application comprising:

a user interface including a selection tool to select an area of an image including text;

a font matching module configured to receive the area of the image including the text from the selection tool and to identify one or more fonts similar to the text using both a convolutional neural network and a font similarity module, wherein:

the convolutional neural network generates a probability distribution as a similarity measure of trained fonts, the convolutional neural network selects one or more trained fonts that are similar to the text in the selected area using the probability distribution, the font similarity module uses a mathematical model to generate a scalar as a similarity measure of untrained fonts, the font similarity module compares the scalar with scalars of the one or more trained fonts, and the font similarity module selects one or more untrained fonts that are similar to the text in the selected area based on the comparison; and a display window within the user interface to display the one or more trained fonts and the one or more untrained fonts as the one or more fonts identified as similar to the text.

16. The system of claim 15, wherein the user interface includes a font selection tool to select one of the one or more fonts for use in the application.

17. The system of claim 15, wherein:

the selection tool is configured to select a different area of the image including text;

the font matching module is configured to automatically receive the different area of the image and to identify one or more fonts similar to the text in the different area; and the display window is configured to display the one or more fonts identified as similar to the text in the different area.

18. The system of claim 15, wherein:

the font matching module is configured to identify both one or more resident fonts similar to the text and one or more non-resident fonts similar to the text; and the display window is configured to render both the one or more resident fonts identified as similar to the text and the one or more non-resident fonts identified as similar to the text for display.

* * * * *